Dec. 6, 1938.        I. J. DRESCH ET AL        2,139,631
                        FOILING METHOD
                     Filed March 28, 1936        2 Sheets—Sheet 1

INVENTOR.
Israel J. Dresch & George S. Weith
BY
Jas. N. Nielsen
ATTORNEY.

Dec. 6, 1938.   I. J. DRESCH ET AL   2,139,631
FOILING METHOD
Filed March 28, 1936   2 Sheets-Sheet 2
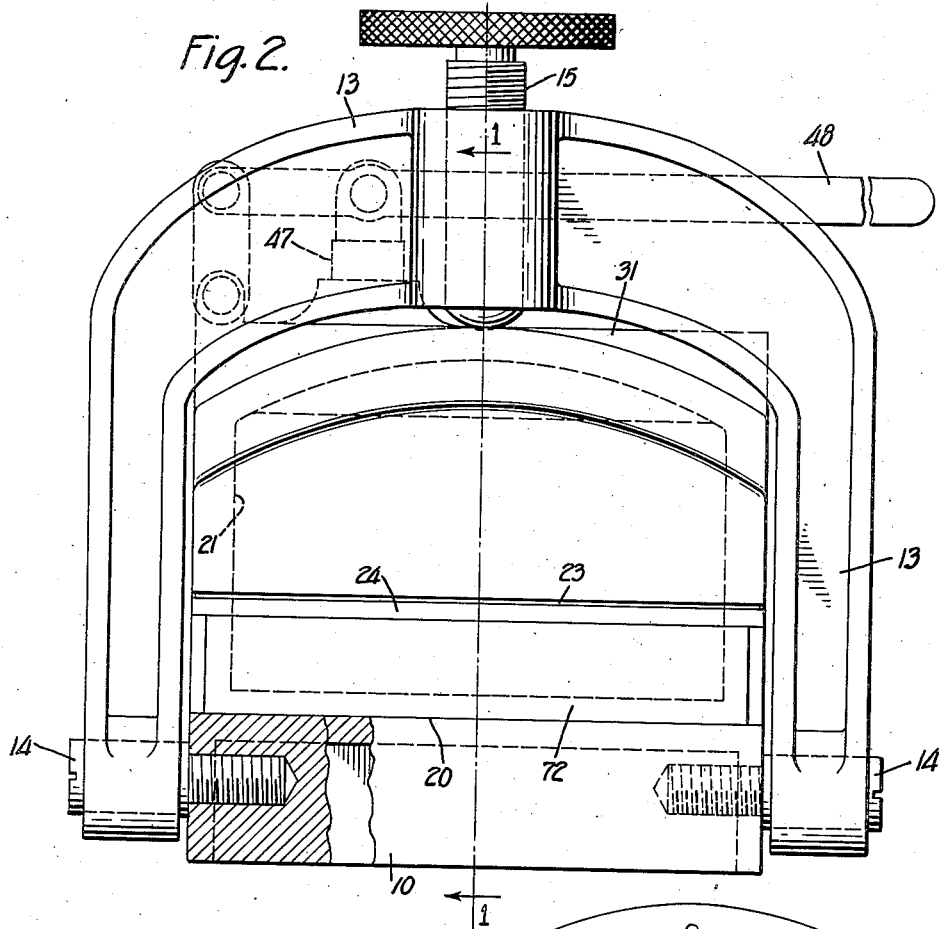
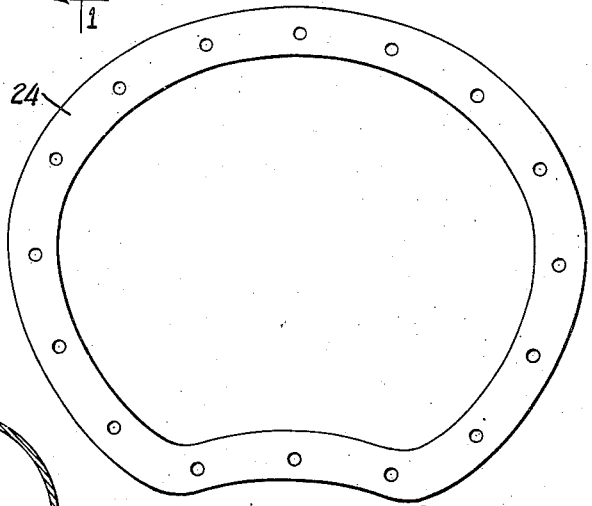
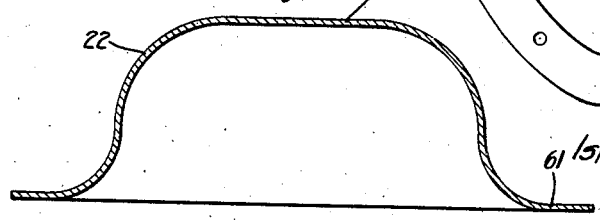
INVENTOR.
Israel J. Dresch & George S. Weith
BY
Jno. N. Nielsen
ATTORNEY.

Patented Dec. 6, 1938

2,139,631

UNITED STATES PATENT OFFICE 2,139,631

FOILING METHOD

Israel J. Dresch, Toledo, Ohio, and George S. Weith, Caldwell, N. J., assignors to Bakelite Dental Products, Inc., New York, N. Y., a corporation of Delaware Application March 28, 1936, Serial No. 71,516

1 Claim. (Cl. 18—55.1)

This invention relates to the application of tin foil or foil of other suitable material to objects or patterns, such as dentures, and to means for its application.

In the preparation of dentures, either from Vulcanite, Celluloid or synthetic resin, the usual procedure is to cast, from an impression of the jaw, a stone or plaster model upon which is constructed a wax pattern of the denture and the artificial teeth inserted therein. This is then invested in plaster of Paris and the wax melted out, thus leaving a mold wherein the space formerly occupied by the wax may be filled with Vulcanite, synthetic resin, or other suitable denture material. Such a mold is usually separable into two parts, one-half being the investment with the teeth therein and the other the model upon which the wax pattern was constructed. Each part is held in a metal container forming the lower and upper halves of a dental flask. The upper half containing the investment and the teeth supported thereby is filled with the desired denture material and the lower half is clamped in position thereon. The flask is closed by applying heat and pressure and is subjected to the further action of heat and pressure whereby transformation to the finished denture is obtained.

At the present time it has become a customary part of the dental technic for making dentures either from Vulcanite or synthetic resin, but more particularly the latter, to apply tin foil to the wax pattern and plaster model as an important aid to the reproduction of carving and a time saver in finishing. It also serves as a steam tight barrier coating on the investment, thus preventing access of steam to the denture material; this is particularly important in the case of synthetic resin denture materials that are susceptible to the action of the steam while undergoing hardening to the infusible state. Accordingly if foiling is carelessly done, the finished denture becomes defective in these respects.

The correct application of tin foil requires a high degree of skill on the part of the operator. Particularly is this true in adapting the foil to the wax pattern, since there is great danger in this case of moving imbedded parts, such as the teeth, or of altering the wax pattern. Hand methods are excessively time consuming, for each strip of foil as applied must be burnished into place. There is also great danger of tearing the foil during this operation, necessitating its repair and readaptation to the pattern.

According to the present invention foil is rapidly and accurately applied to denture patterns or other objects. This is accomplished as hereinafter described by the simultaneous transmission of an equalized pressure to all parts of the surface area of an object such as a wax denture, which has been loosely encased in foil, whereby the foil is caused to conform itself closely and accurately to the surface of the object. By the simultaneous transmission of an equalized pressure to all parts of the surface area tooth displacement or deformation of the wax pattern is avoided.

As a means for securing an equalization of pressure and its simultaneous transmission, a diaphragm of rubber or other material that is flexible or distortible to drape or adapt itself to the surface of the object to be foiled is employed. Preferably the diaphragm is shaped to correspond roughly with that of the object and with its surface area approximating that of the object so that there is a minimum of stretching or folding of the diaphragm during the application of pressure. Such a construction of the diaphragm promotes the direct application of pressure without any substantial movement over the foil and the attendant danger of tearing.

A preferred embodiment of an appliance for the accomplishment of the invention is illustrated in the accompanying drawings wherein Fig. 1 is a longitudinal, vertical cross section of the appliance on the line 1—1 of Fig. 2;

Fig. 2 is an end view of the appliance illustrated in Fig. 1;

Fig. 3 is a vertical cross section of a preferred form of diaphragm; and

Fig. 4 is a top view of a gasket for securing the diaphragm.

Figure 1:
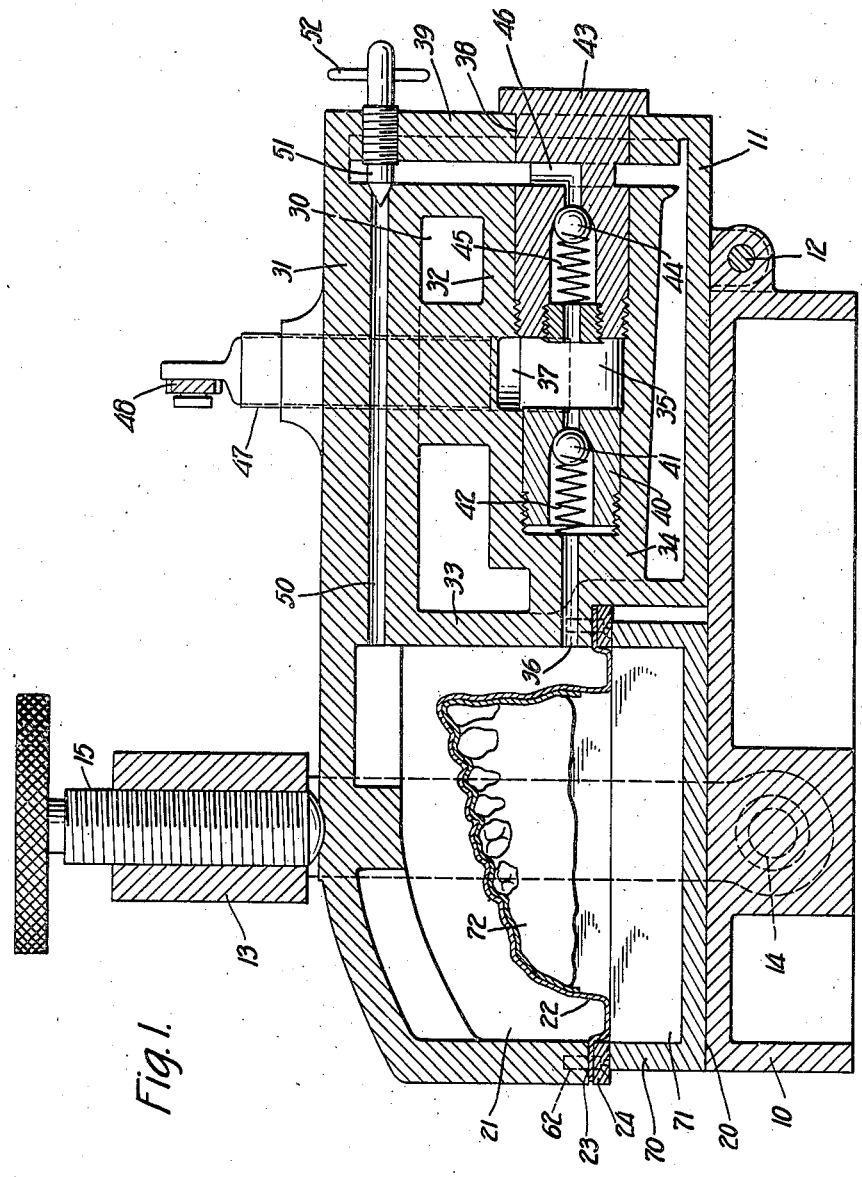

The appliance illustrated comprises a base 10 of cast bronze or other suitable metal. To the rear end of the base a jaw 11 is hinged on a pivot 12. A yoke 13 rides on bearings 14 attached to the forward end of the base 10; the yoke in its raised position encloses the forward end of the jaw 11, and it carries a thumb screw 15 whereby the jaw is clamped to the base.

The base 10 is provided with a bearing surface 20 for supporting the denture or other object to be foiled. Within the jaw there is formed an open chamber or cavity 21 for receiving a denture pattern placed on the surface 20. A diaphragm 22 is secured to the terminal edge 23 of the chamber by means of the gasket 24 thereby closing off the chamber; the gasket holds the diaphragm in fluid-tight connection with the wall of the chamber.

Within the jaw there is also cast a second chamber or reservoir 30; and within the reservoir and attached to the upper wall 31 is a pump casting 32 made integral with the reservoir casting. The pump casting is also integral with the wall 33 of the reservoir at its forward end 34; and it is provided with a horizontal cylindrical bore 35 from which extends an orifice 36 leading through the wall 33 into the chamber 21. A second cylindrical bore 37 in the pump casting extends vertically upward and through the upper wall 31 of the reservoir 30. The vertical bore connects with and is at one side of the horizontal bore 35. In alignment with the horizontal bore 35 is an opening 38 in the rear wall 39 of the reservoir 30.

At the orifice end of the bore 35 is threaded a check-valve body 40 carrying a ball valve 41 and closing spring 42. At the other end of the bore there is a second check-valve body 43 carrying the ball valve 44 and closing spring 45. The body 43 extends to the exterior through the opening 38 of the wall 39 of the reservoir 30, thus permitting insertion and removal of the check-valve bodies; the body 43 also serves as a closure for the opening 38, and an orifice 46 in the body connects with the reservoir 30. In the vertical bore of the pump casting there is a pump plunger 47 operated by the hand lever 48.

A passage 50 through the upper wall of the reservoir 30 forms a return connection between the two chambers 21 and 30. Flow through this passage is controlled by a needle valve 51 which is screw-threaded through the wall of the reservoir 30 and has an external operating handle 52. Water or other fluid can be charged into the reservoir 30 by removing the valve 51.

The diaphragm 22 forming an enclosing wall of the chamber 21 is separately illustrated in Fig. 3. As therein shown it is given a dome formation 60 approximating the shape and size of the pattern or other object that is to be foiled. It is provided with a flanged edge 61 having the peripheral contour of the edge 23 of the chamber wall or of the cooperating gasket 24 as illustrated in Fig. 4. The main body 60 of the diaphragm is flexible or deformable so as to shape itself to the object that it encloses. The edges 61 are preferably of hardened or vulcanized material so as to resist any tearing tendency. The diaphragm and gasket are secured to the chamber wall by screws 62.

In the use of the foiling appliance a flask 70 carrying the plaster mold 71 and the wax denture pattern 72 is placed on the bearing surface 20 of the base 10. The wax pattern is loosely covered with foil. The jaw 11 is brought down whereupon the wax pattern is enveloped by the diaphragm 22, and the jaw is clamped in place through the yoke 13 and the screw 15. Water or other fluid is forced from the reservoir 30 through the orifice 36 into the cavity 21 by the pump plunger 47. As the cavity 21 becomes filled pressure is exerted upon the diaphragm 22 causing the diaphragm to conform itself to the denture, and additional force simultaneously presses the foil against all parts of the denture surface. When the foiling is complete the valve 34 is opened permitting the fluid to flow back into the reservoir 30 and thus release the pressure on the diaphragm. The jaw is thereupon unclamped and lifted to expose the foiled denture.

The appliance described is capable of other forms. For example there can be substituted a closed hollow rubber bag or ball suitably supported and partly filled with water. The bag can be ellipsoidal in shape and of a size sufficient to enclose the object to be foiled. It is positioned over the object with the tin foil loosely adapted to it and is then pressed against the object mechanically through a plunger or force having a concave face corresponding to the shape of the bag and large enough in diameter to enclose it. The bag and plunger can, for example, be part of a press in which the object to be foiled is placed. Pressure is thus applied with substantial equality to all parts of the surface of the object by the bag, and when the pressure is released the foil is left in close adherent contact with the object.

The diaphragm (or bag) can be made of materials other than rubber, provided they are sufficiently flexible or deformable to conform themselves to the surface of the denture pattern or other object to be foiled and impermeable to the fluid used for transmitting or equalizing the pressure. The shape of the diaphragm can be altered to suit the object; it is preferred, however, to approximate before pressure is applied the shape of the object with the surface area of the portion contacting the foil slightly larger to insure avoidance of distortion of the pattern or the displacement of inserts.

While water is the preferred liquid as the most convenient and economical to use, other liquids or gases can be substituted as oils, etc. or compressed air, carbon dioxide, nitrogen, etc. Viscous materials, such as greases, can be substituted for fluids; and even moderately stiff plastics such as modeling clay, are useful for transmitting pressure by preliminarily packing the clay about the pattern and then applying pressure through the medium of a diaphragm.

We claim:

The process of foiling a wax denture pattern subject to deformation under applied pressure which comprises mounting a sheet of foil on the denture pattern, covering the sheet with a flexible diaphragm and applying an equalized fluid pressure to the diaphragm to exert equal pressure on the entire sheet simultaneously.

ISRAEL J. DRESCH.
GEORGE S. WEITH.